United States Patent [19]

Hashimoto et al.

[11] 3,720,143

[45] March 13, 1973

[54] MASK FOR SELECTIVELY EXPOSING PHOTO-RESIST TO LIGHT

[75] Inventors: Toshio Hashimoto, Isao Tanabe, both of Tokyo, Japan

[73] Assignee: Hitachi, Ltd., Tokyo, Japan

[22] Filed: Feb. 2, 1971

[21] Appl. No.: 111,972

[30] Foreign Application Priority Data

Feb. 2, 1970 Japan ....................................45/8500

[52] U.S. Cl. ..............................95/1, 96/38.3, 156/3

[51] Int. Cl................G03b , G03c 5/00, B32b 31/14

[58] Field of Search ......96/38.3, 36; 156/3; 355/125, 355/133; 95/1

[56] References Cited

UNITED STATES PATENTS

| | | | |
|---|---|---|---|
| 3,222,175 | 12/1965 | Rasch | 96/36 |
| 3,622,319 | 11/1971 | Sharp | 96/36 |
| 3,148,099 | 9/1964 | Markoff | 156/3 X |
| 3,322,653 | 5/1967 | Morris | 156/3 X |

*Primary Examiner*—David Klein

*Attorney*—Craig, Antonelli, Stewart & Hill

[57] ABSTRACT

A mask for photoengraving and its method of manufacture, which mask comprises a transparent glass substrate, an aluminum layer formed on the substrate with a predetermined pattern and an anodized aluminum oxide layer formed on the aluminum layer, the aluminum oxide layer may include a substance which does not reflect light, such as ultraviolet rays.

3 Claims, 5 Drawing Figures

Figure 1:
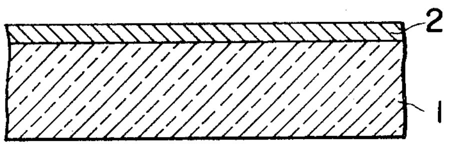

INVENTORS
TOSHIO HASHIMOTO
AND ISAO TANABE
BY
Craig, Antonelli, Stewart & Hill
ATTORNEYS

MASK FOR SELECTIVELY EXPOSING PHOTO-RESIST TO LIGHT

This invention relates to masks for photoengraving and to a method of fabricating such masks.

In manufacturing semiconductor devices, photoengraving techniques are indispensable for completing micro-processing utilizing photographic principles.

Masks fabricated by evaporating chrome on one surface of a transparent glass substrate and by partially removing thereafter the portions of evaporated chrome, have been normally used heretofore. During the exposing step utilizing the chrome mask, the surface of the chrome is overlaid on a processing material, for example, on a surface of photo-resist coated on a silicon dioxide layer of a semiconductor device, and ultraviolet rays are applied thereto.

In this step, since the reflection rate of the chrome is large, a portion of irregularly reflected rays and diffracted rays from the photo-resist surface is reflected again upon the chrome surface, whereby unwanted portions of the photo-resist are exposed to light. Therefore, there exists the defect that the precision of the printed image is lowered.

It is understood that the defect may be eliminated by lowering the reflection rate of the chrome surface, but no suitable method has been proposed.

It is therefore an object of the invention to overcome these and related problems.

More specifically, an object of the invention is to provide a mask for photoengraving which is able to make the resolution of the printed image high, and to provide a method for manufacturing the mask.

FIGS. 1 to 5 are cross-sectional views of a mask for photoengraving, illustrating each manufacturing step according to the present invention.

A detailed explanation of the invention will be made hereinafter by reference to the drawing. The instant invention was described in Disclosure Document No. 462, filed in the U.S. Pat. Office on Sept. 9, 1969.

In FIG. 1 aluminum is evaporated on one surface of conventional transparent glass board 1 to form an aluminum layer 2, in the given embodiment the aluminum layer 2 is formed with a thickness of about 500 to about 700 angstroms.

Figure 2:
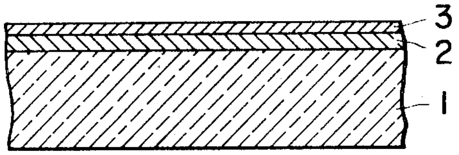

Then the surface of the aluminum layer 2 is oxidized by anodic oxidization whereby an aluminum oxide film 3 is formed as shown in FIG. 2. An anodized oxide film of aluminum is, as is well-known, porous and easily colored. It is desirable that the aluminum oxide film 3 has a thickness not less than about 500 angstroms. In accordance with the described embodiment, the oxide film 3 is colored by depositing into the pores of the oxide film 3 a substance which does not reflect or which absorbs the light for exposing a photo-resist, for example, a substance which colors the oxide film 3 black. In the embodiment, the entire mask having the glass substrate 1, aluminum film 2 and aluminum oxide film 3 is soaked in an aqueous solution comprising silver nitrite ($AgNO_3$) of 10 to 15 grams per liter and an aqueous solution comprising ammonium thisulfate [$(NH_4)_2S_2O_3$] of 10 to 15 grams per liter, during about one minute to color the anodized oxide film 3. Silver sulfide is deposited thereby in the pores of the aluminum oxide film 3.

Then, if necessary, an aqueous solution consisting of 5–5.8 grams nickel acetate, 1 gram cobalt acetate, 8–8.4 grams boric acid and 1 liter water is caused to act on the anodized oxide film 3 for 15 to 20 minutes at a temperature of 70° to 90°C to fill the pores thereof. This aqueous solution has a $P^H$ value of about 5.3 to about 5.5.

Figure 3:
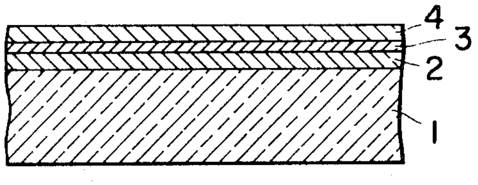

A photo-resist 4 is thinly-coated on the surface of the aluminum oxide layer 3 as shown in FIG. 3.

Figure 4:
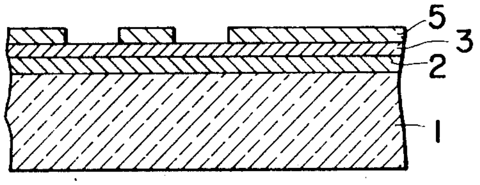

The photo-resist layer 4 is exposed to light with a predetermined pattern. Then, unwanted portions of the photo-resist layer 4, that is, the portions to which the light is not applied in the case that the photo-resist is a negative type or the portions to which the light is applied in the case that the photo-resist is a positive type, are melted and removed by a developing treatment to form a mask 5 for selectively etching the aluminum oxide layer 3 and the aluminum layer 2 as shown in FIG. 4.

Figure 5:
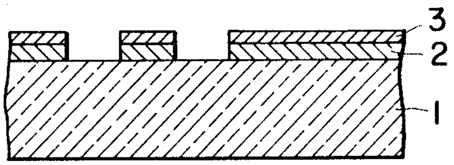

Finally, the portions of the aluminum oxide layer 3 and the aluminum layer 2, on which no photo-resist is provided, are removed by an etchant which does not engrave the photo-resist but engraves the aluminum and aluminum oxide, for example, by an etchant of sodium hydroxide, whereby a mask for photoengraving corresponding to the pattern described in the step (4) is completed as shown in FIG. 5.

The mask for photoengraving obtained by the aforementioned steps has aluminum layers and anodized oxide films of aluminum formed thereon as metal mask portions; therefore, in comparison with the usual mask using chrome, the reflection rate of the metal surface, that is the anodized oxide film, is small, whereby the decrease of resolving-power can be prevented. Also, the hardness and strength of the aluminum oxide film are so great that the mask itself is not easily cracked and unduly worn, and that a metal mask having a lifetime as long as or longer than that of the mask using chrome can be obtained.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What is claimed is:

1. A mask for photoengraving comprising a transparent substrate, a nd a film containing porous aluminum oxide and silver sulfide provided in the pores, said film being formed on a surface portion of said transparent substrate with a thickness of not less than 500 angstroms.

2. A mask for photoengraving comprising a transparent substrate, a first film consisting essentially of aluminum formed on a surface portion of said transparent substrate, and a second film containing porous aluminum oxide and silver sulfide provided in the pores, said second film being formed on said first film with a thickness of not less than 500 angstroms.

3. A method of manufacturing a mask for photoengraving, comprising the steps of forming a first film essentially consisting of aluminum on a transparent substrate, oxidizing at least a surface portion of said first film by anodic oxidation to form a second film essentially of aluminum oxide which includes pores, depositing silver sulfide in the pores, and forming an opening in a predetermined portion of said first and second film to selectively expose the surface of said transparent substrate.

* * * * *